United States Patent [19]
Mallya et al.

[11] Patent Number: 5,232,958
[45] Date of Patent: Aug. 3, 1993

[54] ELECTRON-BEAM CURED EMULSION PRESSURE-SENSITIVE ADHESIVES

[75] Inventors: Prakash Mallya; Sebastian S. Plamthottam, both of Pasadena; Yehuda Ozari, Arcadia, all of Calif.

[73] Assignee: Avery Dennison Corporation, Pasadena, Calif.

[21] Appl. No.: 692,276

[22] Filed: Apr. 26, 1991

Related U.S. Application Data

[63] Continuation of Ser. No. 292,654, Dec. 28, 1988, Pat. No. 5,011,867.

[51] Int. Cl.$^5$ .............. C08F 2/54; C08F 220/10; C08F 220/18; C09J 9/00
[52] U.S. Cl. .................. 522/107; 522/121; 522/153; 526/328.5; 526/329.2; 526/931
[58] Field of Search .............. 522/153, 121; 526/329.2, 328.5, 931

[56] References Cited

U.S. PATENT DOCUMENTS

| | | | |
|---|---|---|---|
| 3,661,618 | 11/1980 | Pastor et al. | 428/500 |
| 4,101,493 | 7/1978 | Nakagawa et al. | 525/305 |
| 4,185,050 | 1/1980 | Lazear et al. | 525/221 |
| 4,414,354 | 11/1983 | Slocombe | 522/86 |
| 4,786,552 | 11/1988 | Sasaki et al. | 428/355 |
| 5,011,867 | 4/1991 | Mallya et al. | 522/153 |

FOREIGN PATENT DOCUMENTS 0092372  5/1985  Japan.

OTHER PUBLICATIONS

Snuparek, Jr., et al., "Water Absorption in Acrylic Latex Films," Journal of Applied Polymer Science, vol. 23, 1421-1428 (1983), pp. 1421-1428.

Satas, "Handbook of Pressure Sensitive Adhesive Technology", Copyright 1989 by Van Nostrand Reinhold, pp. 1-21.

*Primary Examiner*—Marion E. McCamish
*Assistant Examiner*—Susan Berman
*Attorney, Agent, or Firm*—Christie, Parker & Hale

[57] ABSTRACT

Electron-beam cure by itself or in combination with multifunctional additives is used to improve the high-temperature shear properties of emulsion polymerized pressure-sensitive adhesives.

41 Claims, 1 Drawing Sheet

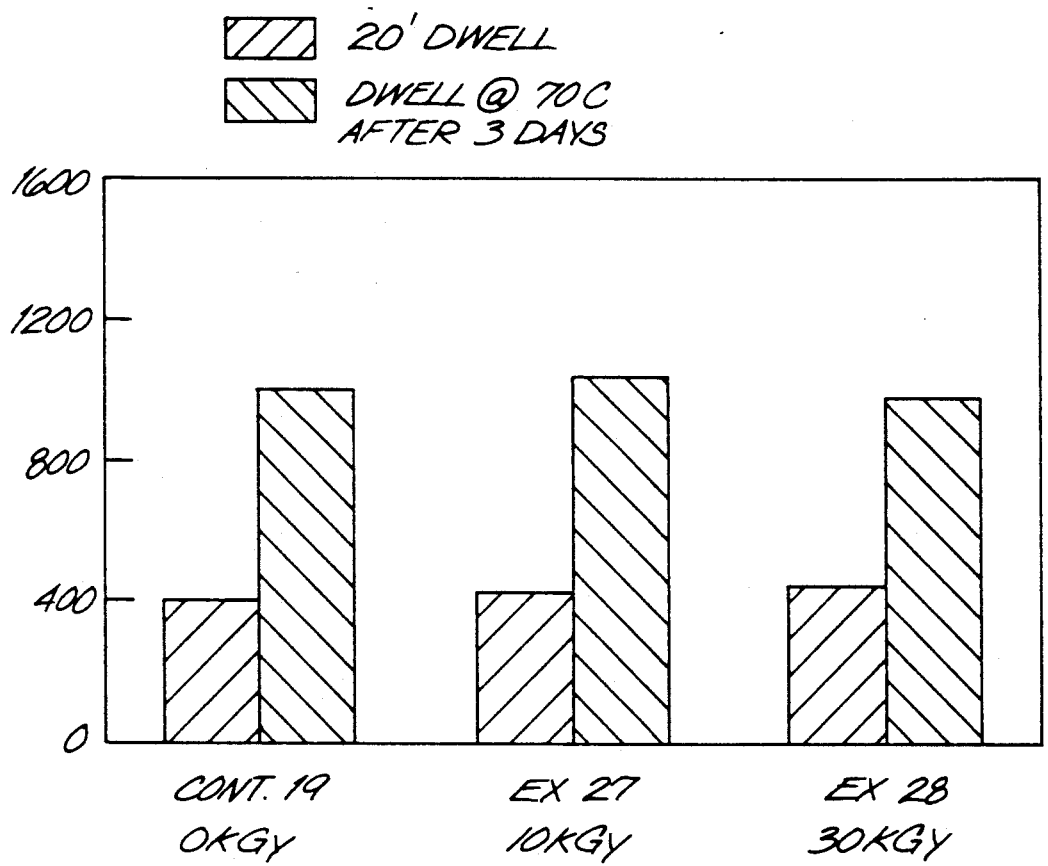

ELECTRON-BEAM CURED EMULSION PRESSURE-SENSITIVE ADHESIVES

This is a continuation of application Ser. No. 07/292,654 filed Dec. 28, 1988, now U.S. Pat. No. 5,011,867, issued Apr. 30, 1991.

BACKGROUND OF THE INVENTION

The present invention is directed to electron beam or EB curing of emulsion-based pressure-sensitive adhesives to provide a pressure-sensitive adhesive with superior elevated temperature shear properties.

Concern over the environment has made attractive pressure-sensitive adhesive polymers formed by emulsion polymerization, as opposed to polymerization in organic solvents. Emulsion polymers can be coated onto a substrate, e.g. face material, release liner, and/or a transfer surface, and a pressure-sensitive adhesive layer formed upon water evaporation.

The possibility of preparing a pressure-sensitive adhesive in an emulsion and UV curing of pressure-sensitive adhesives has been mentioned in the art. Examples include U.S. Pat. No. 3,637,615 to Coffman, U.S. Pat. No. 4,069,123 to Skoultchi et al and U.S. Pat. No. 4,185,050 to Lazear et al. This art has however only illustrated the preparation of polymers in an organic solvent and not in an aqueous media and therefore the effect of UV curing on a polymer prepared in an aqueous media has not been demonstrated.

We have found emulsion-based pressure-sensitive adhesives to have poor high-temperature peel and shear properties.

It is the purpose of the instant invention to provide a technique to improve the high-temperature performance of emulsion-based pressure-sensitive polymers without sacrificing significantly the ambient temperature performance.

SUMMARY OF THE INVENTION

There are provided emulsion pressure-sensitive adhesive compositions curable on exposure to electron-beam (EB) radiation to form adhesives having increased elevated temperature shear properties without a significant change in ambient temperature properties. The adhesives are formed of one or more polymers having a glass transition temperature of at least 20° C. below the use temperature. They may be branched emulsion polymers polymerized at temperatures of at least about 30° C., and predominantly linear emulsion polymers polymerized at a temperature less than about 20° C., and mixtures thereof.

The emulsion polymers are independently formed in emulsion of at least one first monomer which, when homopolymerized, has a glass transition temperature less than about 0° C. and at least one second monomer which, when homopolymerized, has a glass transition temperature greater than about 0° C.

A multifunctional additive is provided to aid cure of branched polymers and benefits all emulsion systems. Multifunctional additives are preferably present in an amount up to about 10% by weight based on the weight of the emulsion-polymers. If employed, the multifunctional additive is preferably present in a concentration of from about 0.2 to about 5% by weight of the emulsion polymer while presently preferred multifunctional additives consist of pentaerythritol triacrylate, trimethylolpropane trimethacrylate, and 1,6-hexanediol diacrylate, and mixtures thereof.

Cure is achieved at EB dosages up to about 100 kilo-Gray (kGy) preferably from about 5 to about 50 kGy. There may be realized upon EB cure pressure-sensitive adhesives having 180° peel in excess of about 250 N/m and a loop tack in excess of about 200 N/m while achieving a 70° C. shear of at least 10 kiloseconds normally in excess of 86 kiloseconds. Shear values at 100° C. in excess of 10 kiloseconds and surprisingly in excess of 86 kiloseconds can also be achieved. As compared to uncured polymers elevated temperature shear (70° C. and 100° C.) may be increased several fold.

Acrylic-based emulsion polymers are preferred. The preferred polymers have a storage modulus (G') of from about $3.2 \times 10^4$ Pa to about $1.2 \times 10^5$ Pa at a frequency of $10^{-1}s^{-1}$ and from about $1.4 \times 10^5$ Pa to about $5.2 \times 10^5$ Pa at a frequency of $10^2 s^{-1}$ and a loss modulus (G'') of from about $9.5 \times 10^3$ Pa to about $3.1 \times 10^4$ Pa at a frequency of $10^{-1}s^{-1}$ and about $7 \times 10^4$ Pa to about $5.6 \times 10^5$ Pa at a frequency of $10^2 s^{-1}$. Acrylic emulsion polymers are preferably formed of about 50 to about 95% by weight of a first monomer which when homopolymerized has a glass transition temperature less than about $-25°$ C. and at least one second monomer which when homopolymerized has a glass transition temperature greater than about $-25°$ C.

THE DRAWING

The attached drawing shows the change in adhesion bond with time of the same composition which had not been exposed (Control L) to electron-beam radiation and which had been exposed to such radiation showing that EB radiation does not detract from the ability of an adhesive to increase adhesion with dwell.

DETAILED DESCRIPTION

According to the present invention, high-temperature performance of emulsion pressure-sensitive adhesives, preferably acrylic-based pressure-sensitive adhesives, is significantly improved by the use of electron-beam radiation. In one embodiment, the emulsion pressure-sensitive adhesives are prepared in a conventional manner and modified by the addition of multifunctional additives and after coating onto a suitable substrate, electron-beam (EB) cured at dosage levels sufficient to increase elevated temperature adhesive performance. Dosage levels employed are up to about 100 kiloGray (kGy) preferably from about 5 to about 50 kGy. For instance, dosages as low as 10 kiloGray (kGy) can enable a realization of and increase the 70° C. shear from 0.4 kilosecond to an excess of 86 kiloseconds at a minimal loss of ambient temperature properties such as 180° peel and loop tack.

By the term "multifunctional additive" there is meant monomers, dimers, trimers, etc., having two or more reactive sites which undergo reactions with the pressure-sensitive adhesive on exposure to electron-beam.

The amount of multifunctional additive can be significantly minimized or eliminated if there is utilized, as part of the pressure-sensitive adhesive, emulsion polymers synthesized at temperatures below about 25° C. to provide polymers of greater linearity and of relatively small particle size. Such pressure-sensitive adhesives, when subjected to electron-beam radiation at levels of about 30 kGy or more, exhibit unusually high elevated temperature shear properties again exceeding 86 kiloseconds at temperatures of 70° C. and 100° C.

The use of electron-beam radiation enables effective resort to water-based systems for producing high performance pressure-sensitive adhesives.

The pressure-sensitive adhesives preferably provided in accordance with the instant invention have a glass transition temperature at least about 20° C. to about 70° C. below use temperature and rheology wherein storage modulus (G') and loss modulus (G") are respectively in the range of about:

G' - $3.2 \times 10^4$ Pa to $1.2 \times 10^5$ Pa (at a frequency of $10^{-1}\text{s}^{-1}$) and $1.4 \times 10^5$ Pa to $5.2 \times 10^5$ Pa (at a frequency of $10^2\text{s}^{-1}$)
G" - $9.5 \times 10^3$ Pa to $3.1 \times 10^4$ Pa (at a frequency of $10^{-1}\text{s}^{-1}$) and $7 \times 10^4$ Pa to $5.6 \times 10^5$ Pa (at a frequency of $10^2\text{s}^{-1}$)

as determined by Method E of ASTM D-4065-82 modified for shear oscillation

High-temperature performance pressure-sensitive adhesives are produced in accordance with the instant invention by coating emulsion pressure-sensitive adhesive polymers onto a substrate, evaporating the water and subjecting the dry coatings to electron-beam radiation at levels sufficient to increase high-temperature performance with minimal loss of other properties.

Emulsion-based pressure-sensitive adhesive polymers for use in the invention may be prepared in accordance with the present invention by copolymerizing monomers to yield a polymer having a glass transition temperature from about 20° C. to about 70° C. below use temperature preferably from about 50° C. to about 70° C. below use temperature. To prepare an emulsion having direct utility for substrate coating, solids content will generally range from about 40 to about 60% by weight solids. Catalysts such as tertiary butyl hydroperoxide or the like may be present in an amount of from about 0.15 to about 0.5 part by weight per 100 parts monomers with surfactant levels ranging from about 0.5% to about 5% by weight based on weight of the monomers.

Reaction temperature, catalyst content and surfactant levels control the nature of the polymer formed. While not bound by theory, elevated reaction temperatures, e.g. temperatures of about 30° C. or more, tend to yield polymers which are more branched than polymers synthesized at lower temperatures. Thus, as used herein, the term "branched polymer" means a polymer emulsion synthesized at a temperature above about 30° C. and is not normally responsive to the action of EB-radiation in the absence of a multi-functional monomer; while the term "linear polymer" means a polymer emulsion synthesized at a temperature below about 25° C. and responsive to the action of EB radiation without the addition of a multifunctional additive. An exception for the "branched polymers" may be situations where a pendant group(s) of the monomers leading to the polymer are reactive and/or where the surfactant employed is reactive with the monomers and/or polymer. Reactive surfactants are those based on $C_7-C_{16}$ unsaturated fatty acids. The inclusion of a multifunctional additive, generally in levels in an amount up to about 10% preferably from about 0.2 to about 5% by weight of total adhesive polymer content, enables a marked increase of high-temperature performance at EB dosage levels as low as 10 kGy or less. In fact, there appears to be a peak where, after some level of EB dosage is reached, high-temperature performance although improved, begins to drop off due to excessive crosslinking.

By a "multifunctional additive" as used herein, there is meant an additive having 2 or more pendant functional groups, preferably acrylate or methacrylate groups. As representative multifunctional additives there may be mentioned pentaerythritol triacrylate (PETA), triethyleneglycol diacrylate, triethyleneglycol dimethacrylate, trimethylolpropane trimethacrylate (TMPTMA), trimethylolpropane triacrylate, tripropyleneglycol diacrylate, tripropyleneglycol dimethacrylate, 1,3-butyleneglycol dimethacrylate, tetraethyleneglycol dimethacrylate, 1,6-hexanediol diacrylate (HDDA), and the like. Multifunctional additives having ethoxylated and propoxylated backbones may also be effectively used. As indicated, concentrations will vary depending on polymer nature and electron-beam dosage levels.

In general, multifunctional additive concentrations can range from 0 to about 10% or more by weight of the emulsion polymer. None is required for highly linear polymers. Their presence is however beneficial. Blends of linear and branched polymers need multifunctional additives corresponding to the level of branched polymer in the mixture. A presently preferred range is from about 0.2 to about 5% by weight based on the weight of the polymers.

While not bound by theory, a possible explanation for the beneficial use of multifunctional additives is that they may have a plasticizing effect on high gel content of branched emulsion polymers, i.e. polymers prepared at temperatures of about 30° C. or more. Because of high gel content, diffusion of polymer chains between neighboring particles may be restricted. The addition of the multifunctional additives may have a plasticizing effect and lead to improved diffusion of the polymer chains between particles, and crosslinking the polymer chains by EB radiation provides high elevated temperature shear with minimal, if no, loss in ambient temperature performance. Another possibility is that bridging between polymer particles occurs where otherwise crosslinking would be restricted to the body of the particle with interparticle bonds remaining low.

Forming the emulsion using low temperatures, high surfactant levels, and low initiator levels forms a pressure-sensitive adhesive of relatively low particle size. These pressure-sensitive adhesives, when also subjected to relatively low levels of EB radiation, e.g. about 30 kGy, also exhibit unusually high elevated temperature performance despite the absence of added multifunctional additives, although the multifunctional additives can be effectively used to lower EB dosage levels.

A possible explanation for this is that at low temperatures, branching and crosslinking reactions are minimized and the polymer obtained is of lower gel content and is more linear than those synthesized at higher temperatures. This appears to enhance interparticle diffusion of the polymer chains despite even higher molecular weight. The high degree of diffusion leads to greater entanglement between the polymer chains of neighboring particles allowing the use of EB radiation without a multifunctional additive to achieve high elevated temperature performance.

The emulsion polymers provided as pressure-sensitive adhesives of the instant invention generally comprise from about 50% to about 95% by weight of one or more first monomer, which if homopolymerized, would have a glass transition temperature of less than about $-25°$ C. based on the total weight of the monomers. Exemplary are the alkyl acrylates, such as butyl acrylate, propylacrylate, 2-ethylhexyl acrylate, isooctyl acrylate, isodecyl acrylate; mono and diesters of unsaturated dicarboxylic acids, such as dibutyl fumarate and the like.

The balance of the monomer system is comprised of second monomers which if homopolymerized would have a glass-transition temperature greater than −25° C., normally greater than about 10° C. Among such monomers there may be mentioned ethyl acrylate, alkyl methacrylates, such as methyl methacrylate, ethyl methacrylate, butyl methacrylate and the like; copolymerizable vinyl-unsaturated monomers, such as vinyl acetate, vinyl propionate and the like; and styrenic monomers, such as styrene, methylstyrene and the like; unsaturated carboxylic acids, such as acrylic acid, methacrylic acid, itaconic acid, fumaric acid and the like.

As indicated, emulsion polymers prepared in accordance with the present invention, to be functional pressure-sensitive adhesives, must have a net effective glass-transition temperature of from about 20° to about 70° C. below the use temperature, preferably from about 50° to about 70° C. below the use temperature. Accordingly, the monomers used in the preparation of polymers of the instant invention are proportioned to provide polymerization products falling within the designated glass-transition temperature. It is for this reason that the first monomers, preferably one or more alkyl acrylates, are provided as the bulk of the monomers employed and are typically present in an amount of from about 50 to about 95 percent by weight based on the total weight of the monomers. It is also desired that they have pendant acrylate or methacrylate groups to enhance EB cure.

The emulsions formed including added multifunctional additives are coated on any suitable substrate such as face stock, release liner stock or transfer surfaces by means known in the art. Net solids coating weights generally range from about 40 or less to about 60 grams or more per square meter. Following evaporation of water, the residual solids are exposed to electron-beam radiation at levels sufficient to increase high-temperature properties, particularly shear, without adversely affecting peel and tack at normal use temperatures. Electron-beam dosages may range from about 10 kiloGray (kGy) or less up to about 100 kGy preferably 50 kGy or less depending on the nature of the polymer and amount of multifunctional additives present, with required dosages being lowered by the presence of a multifunctional additive. The presence of a multifunctional additive can also create a limit on the EB dosages used. A peak is reached at some level after which the level of increase of elevated temperature shear will be reduced but still be above the level which existed prior to cure.

It will be appreciated that there may be included in the pressure-sensitive adhesives, tackifiers, fillers, plasticizers and the like.

The following Examples illustrate the invention. With reference thereto, multifunctional monomer is given in percent by weight. Test methods utilized were as follows: shear by ASTM D-3654-78 and D-1000-68 and PSTC (PressureSensitive Tape Council) Test #7, 6th Edition (½"×½" 500 G, 0 dwell at 70° C. and/or 100° C.); 180 peel by PSTC Test #1, 6th Edition (20 minute dwell) and loop tack by PSTC Test #7, 6th Edition.

Emulsion Polymer 1 (E-1) and Controls A to E and Examples 1-6

To 1-liter jacketed reactor flask, fitted with a mechanical stirrer, there was charged with 85.0 grams deionized water, 0.05 gram ferric EDTA (ethylenediamine- tetraacetic acid), 0.5 gram diammonium phosphate, 0.55 gram DoWfax 2A1 (commercially available from Dow Chemical Co., 45% active) and 50.0 grams of dibutyl fumarate.

A monomer pre-emulsion was made up by dissolving 8.93 grams of Triton X-200 (commercially available from Rohm & Haas Co., 28% active) in 75.0 grams deionized water and adding a mixture of 137.5 grams 2-ethyl hexyl acrylate, 57.5 grams methyl methacrylate, 5.0 grams acrylic acid, 1.0 gram t-butyl hydroperoxide (70% active), 0.35 gram n-dodecyl mercaptan, and 0.375 gram 1,6-hexanediol diacrylate. 57.13 grams of this pre-emulsion was added to the reactor flask, the contents purged with $N_2$ and temperature maintained at 30° C.

An aqueous solution was made up by dissolving 1.0 gram of sodium formaldehyde sulfoxylate (commercially available from Diamond Shamrock under the trade name Hydrosulfite AWC) in 75 grams deionized water. 11.4 grams of this solution was added to the reactor flask and 10 minutes later the contents were heated to 45° C. and the simultaneous addition of the remaining 64.6 grams of aqueous solution and 228.53 grams of pre-emulsion was started. The pre-emulsion was added over 2.5 hours and aqueous solution, over 3 hours. The temperature was maintained between 45 and 48° C. throughout the addition. After the additions were complete, the contents were held at this temperature for an additional hour and then discharged. The total coagulum on filtering through 150 micron screen was less than 0.02% (dry).

The performance properties of the adhesive coating obtained from the above emulsion polymer (E-1) are listed in Table I. The latex had a solids content of 51.0%, viscosity at pH=7.0 being 0.44 Pa.S (Brookfield RVT, #4 @ 100 rpm, $NH_3$ as the base), particle size of 139 nm and excellent mechanial stability (Haake, 40,000 $s^{-1}$). In the evaluation, the multifunctional acrylate, if present, was added to the emulsion and the emulsion coated onto 2 mil Mylar to a level up to 54 g/m² and if EB cured, EB cured through Mylar.

TABLE I

| Ex/Cont. | Latex | MFA | EB Dosage | 180° Peel RT, SS, 20' N/m | Loop Tack RT, SS N/m | RT Shear ½ kg, ½ × ½, SS ksec | 70° Shear ½ kg, ½ × ½, SS ksec |
|---|---|---|---|---|---|---|---|
| Cont. A | E-1 | 0 | 0 | 653 | 593 | 86.4+ | 0.4 |
| Cont. B | E-1 | 0 | 10 kGy | 607 | 527 | 85.5 | 1.1 |
| Cont. C | E-1 | 0 | 20 kGy | 620 | 487 | 84.8 | 1.1 |
| Cont. D | E-1 | 2% HDDA | 0 | 613 | 580 | 48.67+ | 0.46 |
| Ex. 1 | E-1 | 2% HDDA | 10 kGy | 575 | 530 | 86.4+ | 86.4+ |
| Ex. 2 | E-1 | 2% HDDA | 30 kGy | 580 | 525 | 86.4+ | 47.9 |
| Ex. 3 | E-1 | 2% TMPTMA | 10 kGy | 520 | 470 | 86.4+ | 86.4+ |
| Ex. 4 | E-1 | 2% TMPTMA | 30 kGy | 480 | 445 | 86.4+ | 13.0 |
| Cont. E | E-1 | 2% PETA | 0 | 640 | 570 | 86.4+ | 0.4 |

TABLE I-continued

| Ex/Cont. | Latex | MFA | EB Dosage | 180° Peel RT, SS, 20' N/m | Loop Tack RT, SS N/m | RT Shear ½ kg, ½ × ½, SS ksec | 70° Shear ½ kg, ½ × ½, SS ksec |
| --- | --- | --- | --- | --- | --- | --- | --- |
| Ex. 5 | E-1 | 2% PETA | 10 kGy | 470 | 385 | 86.4+ | 39.5 |
| Ex. 6 | E-1 | 2% PETA | 30 kGy | 465 | 410 | 86.4+ | 17.4 |

SS = stainless steel
+ means samples did not fail at this point.

Emulsion Polymers (E-2) and (E-3) and Controls G and H and Examples 7–13

This emulsion polymer was synthesized using the equipment as outlined in Example 1. The reactor was charged with 175 grams deionized water, 0.05 gram ferric EDTA and 1.88 grams Aerosol MA 80 (commercially available from American Cyanamid, 80% active) A monomer pre-emulsion was made up by dissolving 20.68 grams of Triton X-200 and 7.0 grams of Aerosol MA-80 in 116.8 grams of distilled water and adding a mixture of 266.2 grams 2-ethylhexyl acrylate, 14.01 grams acrylic acid and 0.56 gram t-butyl hydroperoxide. An aqueous solution was made up by dissolving 0.6 gram of hydrosulfite AWC in 150 grams of deionized water. The reactor mixture was purged with nitrogen, cooled to 5° C., and the pre-emulsion and aqueous solution feeds were started simultaneously. The pre-emulsion was added over 2.5 hours, aqueous solution over 2.75 hours, temperature being maintained between 5° and 8° C. The contents were held at 5° C. for 2 more hours, discharged (after filtering through cheesecloth) and neutralized to a pH of 7.2 with $NH_3$. The total coagulum was 1.0 gram, the solids content of the emulsion was 38.9%, and the particle size was 139 nm. The performance of this polymer and another polymer (E-3) prepared in the same manner are shown in Table II. E-3 contained 90 parts 2-ethyl hexyl acrylate and 10 parts acrylic acid. Respective coating weights were 42 and 44 g/m² on 2 mil Mylar with cure through Mylar.

The initial reactor charge had in addition to the ingredients listed in Example 2, 11.07 grams of Triton X-200. The pre-emulsion was made up by dissolving 22.14 grams of Triton X-200 in 125 grams of deionized water and adding a mixture of 217.5 grams of 2-ethylhexyl acrylate, 67.5 grams of vinyl acetate, 15.0 grams of acrylic acid, and 0.6 grams of t-butyl hydroperoxide. The aqueous solution was made up by dissolving 3.75 grams of Aerosol MA-80 and 0.6 gram of hydrosulfite in 150.0 grams of deionized water. The resulting latex had very low viscosity and no coagulum. The solids content of the latex was 38.0%, particle size = 161 nm, and viscosity at pH = 6.2 was 4.56 Pa.s (Brookfield, RVT, #7 @ 100 rpm).

The performance of this polymer is listed in Table III (E-4) along with a polymer prepared in the same manner but containing 95 parts isooctylacrylate and 5 parts acrylic acid (E-5). The latexes were coated to a level between 45 and 47 gr/m² on 2 mil Mylar with cure through mylar.

The product of Example 15 when allowed to dwell for 24 hours displayed an increase from 180° peel to 490 N/m and in Example 16 increased to 455 N/m.

TABLE III

| Ex/Cont. | Latex | EB Dosage | 180° Peel RT, SS, 20' N/m | Loop Tack RT, SS N/m | Polyken A-1-1 kPa | RT Shear SS, ½ × ½, 500 g ksec | 70° C. Shear SS, ½ × ½, 500 g ksec | 100° C. Shear SS, ½ × ½, 500 g ksec |
| --- | --- | --- | --- | --- | --- | --- | --- | --- |
| Cont. I | E-4 | 0 | 297 | 383 | 61 | 86.4+ | 86.4+ | 0.12 |
| Ex. 14 | E-4 | 30 kGy | 283 | 383 | 69 | 86.4+ | 86.4+ | 86.4+ |
| Ex. 15 | E-4 | 50 kGy | 283 | 297 | 85 | 86.4+ | 86.4+ | 240+ |
| Cont. J | E-5 | 0 | 353 | 378 | 189 | 177 | 0.19 | 0 |
| Ex. 16 | E-5 | 30 kGy | 260 | 322 | 180 | 421.2+ | 86.4+ | 86.4+ |
| Ex. 17 | E-5 | 50 kGy | 218 | 290 | 185 | 421.2+ | 86.4+ | 86.4+ |
| Ex. 18 | E-5 | 80 kGy | 172 | 267 | 170 | 86.4+ | 86.4+ | 86.4+ |

Control K and Examples 19–26

Table IV shows the blend exhibiting high 180° peel and tack value compared to base low-temperature polymers retaining the elevated temperature (70° C.) shear properties. Table V shows the good peel adhesion properties to different substrates at elevated temperature.

TABLE II

| Ex/Cont. | Latex | EB Dosage | 180° Peel RT, SS, 20' N/m | Loop Tack RT, SS N/m | Polyken A-1-1 kPa | RT Shear SS, ½ × ½, 500 g ksec | 70° Shear SS, ½ × ½, 500 g ksec | 100° C. Shear SS, ½ × ½, 500 g ksec |
| --- | --- | --- | --- | --- | --- | --- | --- | --- |
| Cont. F | E-2 | 0 | 370 | 290 | 185 | 14.6 | 0.12 | 0.03 |
| Ex. 7 | E-2 | 10 kGy | 375 | 230 | 173 | 216+ | 25.5 | 0.2 |
| Ex. 8 | E-2 | 30 kGy | 355 | 250 | 170 | 216+ | 86.4+ | 86.4+ |
| Ex. 9 | E-2 | 50 kGy | 230 | 190 | 130 | 86.4+ | 86.4+ | 225 |
| Ex. 10 | E-2 | 80 kGy | 280 | 250 | 162 | 46+ | 86.4+ | 86.4+ |
| Cont. G | E-3 | 0 | 297 | 310 | 253 | 48.2 | 0.27 | — |
| Ex. 11 | E-3 | 30 kGy | 243 | 270 | 206 | 86.4+ | 86.4+ | 234+ |
| Ex. 12 | E-3 | 50 kGy | 140 | 243 | 206 | 86.4+ | 86.4+ | 234+ |
| Ex. 13 | E-3 | 80 kGy | 150 | 183 | 119 | 86.4+ | 86.4+ | 86.4+ |

Emulsion Polymers (E-4) and (E-5) and Controls I and J and Examples 14–18

This emulsion polymer was synthesized using the equipment and procedure outlined for polymer E-2.

For this test the adhesive was coated on 2 mil Mylar at 99 g/sq. m. Peel values are in N/m for the substrates shown.

FIG. 1 illustrates the value of Composition B as a repositionable adhesive in that bond strength more than doubled after 3 days dwell at 70° C. It is significant that electron-beam cure, while providing the benefit of elevated temperature shear, did not detract from the advantageous peel adhesion buildup on extended dwell.

TABLE IV

| Ex/Cont. | Latex | EB Dosage | Dwell (Hr.) | 180° Peel RT, SS, 20' N/m | Loop Tack RT, SS N/m | RT Shear SS, ¼ × ¼, 500 g ksec | 70° C. Shear SS, ¼ × ¼, 500 g ksec | 100° C. Shear SS, ¼ × ¼, 500 g ksec |
|---|---|---|---|---|---|---|---|---|
| Ex. 14 | E-4 | 30 kGy | | 283 | 383 | 86.4+ | 86.4+ | 86.4+ |
| Ex. 1 | E-1 + 2% HDDA | 10 kGy | 0 | 575 | 530 | 86.4+ | 86.4+ | 1.14 |
| Cont. K | A | 0 | 0 | 470 | 470 | 86.4+ | 0.48 | — |
| Ex. 19 | " | 10 kGy | 0 | 470 | 510 | 86.4+ | 86.4+ | 86.4+ |
| Ex. 20 | " | 30 kGy | 0 | 430 | 490 | 86.4+ | 86.4+ | 86.4+ |
| Ex. 21 | " | 30 kGy | 0 | 525(1) | | | | |
| Ex. 22 | " | 50 kGy | 0 | 470 | 410 | 86.4+ | 86.4+ | 86.4+ |
| Ex. 23 | " | 50 kGy | 24 | 540 | | | | |
| Ex. 24 | B | 10 kGy | 0 | 450 | 450 | 86.4+ | 86.4+ | 86.4+ |
| Ex. 25 | " | 30 kGy | 0 | 440 | 440 | 86.4+ | 86.4+ | 86.4+ |
| Ex. 26 | " | 30 kGy | 24 | 580 | | | | |

A = 44E-4/56E-1/0.57 HDDA
B = 64E-4/36E-1/0.36 HDDA
(1) = 70° C. peel

TABLE V

| 180° Peel | Substrate SS | ABS | NAD |
|---|---|---|---|
| 70° C. | 780 | 480 | 455 |
| 100° C. | 400 | 390 | 350 |

ABS = Acrylonitrite-Butadiene-Styrene
NAD = Surface-coated with a solvent-based paint, i.e. non-aqueous dispersion Table VI shows the glass transition temperature and mechanical properties of various emulsion polymers of this invention.

TABLE VI

| | Latex | EB Dosage (kGy) | Tg °C. | Frequency rad/sec. | G' Pa | G" Pa |
|---|---|---|---|---|---|---|
| 1) | E-2 | 0 | −67.5 | a) $10^{-1}$ | $3.4 \times 10^4$ | $1.4 \times 10^4$ |
| | | | | b) $10^2$ | $1.4 \times 10^5$ | $7.0 \times 10^4$ |
| 2) | E-3 | 0 | −68 | a) $10^{-1}$ | $3.2 \times 10^4$ | $1.3 \times 10^4$ |
| | | | | b) $10^2$ | $1.4 \times 10^5$ | $7.1 \times 10^4$ |
| 3) | E-4 | 0 | −50 | a) $10^{-1}$ | $1.0 \times 10^5$ | $2.8 \times 10^4$ |
| | | | | b) $10^2$ | $4.0 \times 10^5$ | $2.4 \times 10^5$ |
| 4) | E-5 | 0 | −53.6 | — | — | — |
| 5) | E-2 | 50 | — | — | — | — |
| 6) | E-4 | 50 | — | a) $10^{-1}$ | $1.2 \times 10^5$ | $3.1 \times 10^4$ |
| | | | | b) $10^2$ | $4.8 \times 10^5$ | $3.3 \times 10^5$ |
| 7) | E-5 | 50 | — | a) $10^{-1}$ | $3.6 \times 10^4$ | $9.5 \times 10^3$ |
| | | | | b) $10^2$ | $1.4 \times 10^5$ | $7.2 \times 10^4$ |
| 8) | Ex. 25 | 30 | — | a) $10^{-1}$ | $7.4 \times 10^4$ | $2.3 \times 10^4$ |
| | | | | b) $10^2$ | $5.2 \times 10^5$ | $3.7 \times 10^5$ |

What is claimed is:

1. A cured pressure-sensitive adhesive which comprises a branched chain emulsion polymer having a glass transition temperature of at least 20° C. below the use temperature, and formed by emulsion polymerization of at least one first monomer which, when homopolymerized, has a glass transition temperature less than −25° C. and at least one second monomer which, when homopolymerized, has a glass transition temperature greater than −25° C., and said emulsion polymer being cured in the presence of from about 0.2 to about 10% by weight based on the weight of the emulsion-polymer of a multifunctional additive and exposure to electron beam radiation at a dosage of up to 100 kGy and sufficient to provide a 70° C. shear of at least 10 kiloseconds and a 180° peel of at least about 250 N/m, and a loop tack of at least about 200 N/m at a coat weight of from about 40 to 60 g/m².

2. A cured pressure-sensitive adhesive as claimed in claim 1 in which the multifunctional additive is present in a concentration of from about 0.2 to about 5% by weight of the emulsion polymer.

3. A cured pressure-sensitive adhesive as claimed in claim 1 in which the multifunctional additive is selected from the group consisting of pentaerythritol triacrylate, trimethylolpropane trimethacrylate, and 1,6-hexanediol diacrylate, and mixtures thereof.

4. A cured pressure-sensitive adhesive as claimed in claim 1 in which the first monomer is selected from the group consisting of alkyl acrylates, monoesters of unsaturated dicarboxylic acids and diesters of unsaturated dicarboxylic acids, and mixtures thereof.

5. A cured pressure-sensitive adhesive as claimed in claim 4 in which the second monomer includes an unsaturated carboxylic acid.

6. A cured pressure-sensitive adhesive as claimed in claim 4 in which the multifunctional additive is selected from the group consisting of pentaerythritol triacrylate, trimethylolpropane trimethacrylate, and 1,6-hexandiol diacrylate, and mixtures thereof.

7. A cured pressure-sensitive adhesive as claimed in claim 1 in which the electron-beam dosage was from about 5 to about 50 kGy.

8. A cured pressure-sensitive adhesive which comprises a cured branched chain acrylic emulsion polymer having a glass transition temperature of 20° C. to about 70° C. below the use temperature, said branched chain acrylic emulsion polymer polymerized in emulsion at temperatures of at least about 30° C., said emulsion polymer formed of at least one first monomer which, when homopolymerized, has a glass transition temperature less than −25° C. and at least one second monomer which, when homopolymerized, has a glass transition temperature greater than −25° C., said emulsion polymer being cured in the presence of about 0.2 to about 10% by weight of a multifunctional additive based on the weight of the emulsionpolymer, the emulsion-polymer includes a, said pressure-sensitive adhesive being cured by exposure to electron beam radiation at a dosage up to 100 Gy to provide a pressure-sensitive adhesive having a 70° C. shear of at least 86 kiloseconds, a 180° peel in excess of about 250 N/m, and a loop tack in excess of about 200 N/m at a coat weight of 40 to 60 g/m².

9. A cured pressure-sensitive adhesive as claimed in claim 8 in which the multifunctional additive is present in a concentration of from about 0.2 to about 5% by weight of the emulsion polymer.

10. A cured pressure-sensitive adhesive as claimed in claim 8 in which the multifunctional additive is selected from the group consisting of pentaerythritol triacrylate, trimethylolpropane trimethacrylate, and 1,6-hexanediol diacrylate, and mixtures thereof.

11. A cured pressure-sensitive adhesive as claimed in claim 10 in which the first monomer is selected from the group consisting of 2-ethyl hexylacrylate, isooctyl acrylate, and mixtures thereof; and the second monomer comprises acrylic acid.

12. A cured pressure-sensitive adhesive as claimed in claim 8 in which the electron-beam dosage was from about 5 to about 50 kGy.

13. A pressure-sensitive adhesive as claimed in claim 12 in which the unsaturated carboxylic is acrylic acid.

14. A cured pressure-sensitive adhesive which comprises a branched chain acrylic emulsion polymer having a glass transition temperature of from about 20° C. to about 70° C. below the use temperature and having a storage modulus (G') of from about $3.2 \times 10^4$ Pa to about $1.2 \times 10^5$ Pa at a frequency of $10^{-1}s^{-1}$ and from about $1.4 \times 10^5$ Pa to about $5.2 \times 10^5$ Pa at a frequency of $10^2 s^1$ and a loss modulus (G'') of from about $9.5 \times 10^3$ Pa to about $3.1 \times 10^4$ Pa at a frequency of $10^s$ and about $7 \times 10^4$ Pa to about $5.6 \times 10^5$ Pa at a frequency of $10^2 s^1$, said branched chain acrylic emulsion polymer formed of about 50 to about 95% by weight of a first monomer which when homopolymerized has a glass transition temperature greater than $-25°$ C. and at least one second monomer which when homopolymerized has a glass transition temperature less than $-25°$ C., said acrylic emulsion polymer being cured in the presence of about 0.2 to about 10% by weight of a multifunctional additive based on the weight of the emulsion polymer and multifunctional additive and exposure to electron beam radiation at a dosage up to 10 kGy, said electron-beam cured, pressure-sensitive adhesive providing a 180° peel of at least about 250 N/m, and a loop tack of at least about 200 N/m and a 70° C. shear of at least about 10 kiloseconds at a coat weight of 40–60 g/m².

15. A cured pressure-sensitive adhesive as claimed in claim 14 in which the multifunctional additive is present in a concentration of from about 0.2 to about 5% by weight of the acrylic emulsion polymer.

16. A cured pressure-sensitive adhesive as claimed in claim 14 in which the multifunctional additive is selected from the group consisting of pentaerythritol triacrylate, trimethylolpropane trimethacrylate, and 1,6-hexanediol diacrylate, and mixtures thereof.

17. A cured pressure-sensitive adhesive as claimed in claim 14 in which the first monomer is selected from the group consisting of alkyl acrylates, monoesters of unsaturated dicarboxylic acids, diesters of unsaturated dicarboxylic acids and mixtures thereof.

18. A pressure-sensitive adhesive as claimed in claim 17 in which the first monomer is selected from the group consisting of 2-ethyl hexylacrylate, isooctyl acrylate, and mixtures thereof; and the second monomer comprises an unsaturated carboxylic acid.

19. A cured pressure-sensitive adhesive as claimed in claim 17 in which the second monomer includes an unsaturated carboxylic acid.

20. A cured pressure-sensitive adhesive as claimed in claim 14 in which the 70° C. shear is at least about 86 kiloseconds.

21. A cured pressure-sensitive adhesive as claimed in claim 14 in which the electron-beam dosage was from about 5 to about 50 kGy.

22. A cured pressure-sensitive adhesive comprising an electron-beam cured branched emulsion polymer having a glass transition temperature of at least 20° C. below the use temperature and formed by emulsion polymerization of at least one first monomer which, when homopolymerized, has a glass transition temperature less than $-25°$ C. and at least one second monomer which, when homopolymerized, has a glass transition temperature greater than $-25°$ C., said branched emulsion polymer cured by exposed to electron-beam radiation at a dosage of up to about 100 kGy in the presence of a multifunctional additive present in an positive amount of from about 0.2 to about 10% by weight of the branched emulsion polymer, the cure providing a 70° C. shear for the branched emulsion polymer of at least about 10 kiloseconds while providing a 180° peel at least about 250 N/m and loop tack of at least about 200 N/m at an adhesive coat weight of from about 40 to about 60 g/m².

23. A cured-electron beam pressure-sensitive adhesive composition as claimed in claim 22 in which the multifunctional additive is present in a concentration of from about 0.2 to about 5% by weight of the emulsion polymer.

24. A cured pressure-sensitive adhesive composition as claimed in claim 22 in which the multifunctional additive is selected from the group consisting of pentaerythritol triacrylate, trimethylolpropane trimethacrylate, and 1,6-hexanediol diacrylate, and mixtures thereof.

25. A cured pressure-sensitive adhesive composition as claimed in claim 22 in which the first monomer is selected from the group consisting of alkyl acrylates, monoesters of unsaturated dicarboxylic acids and diesters of unsaturated dicarboxylic acids, and mixtures thereof.

26. A cured pressure-sensitive adhesive composition as claimed in claim 25 in which the second monomer includes an unsaturated carboxylic acid.

27. A cured pressure-sensitive adhesive comprising an electron-beam cured branched emulsion polymer having a glass transition temperature of at least 20° C. below the use temperature, said branched emulsion polymer prepared at a temperature greater than about 30° C. and cured in admixture with a multifunctional additive present in an amount of from about 0.2 to about 5% by weight of the branched emulsion polymer, said emulsion polymers formed by emulsion polymerization of at least one first monomer which, when homopolymerized, has a glass transition temperature less than $-25°$ C. and at least one second monomer which, when homopolymerized, has a glass transition temperature greater than $-25°$ C., said branched emulsion polymer cured by exposure to electron-beam radiation at a dosage of up to about 100 kGy and sufficient to provide 70° C. shear of at least about 10 kiloseconds while providing a 180° peel at least about 250 N/m and loop tack at least about 200 N/m at a coat weight from about 40 to 60 g/m².

28. A cured pressure-sensitive adhesive which comprises an electron-beam cured branched acrylic emulsion polymer having a glass transition temperature of at least about 20° C. below the use temperature and having a storage modulus (G') of from about $3.2 \times 10^4$ Pa to about $1.2 \times 10^5$ Pa at a frequency of $10^1 s^{-1}$ and from about $1.4 \times 10^5$ Pa to about $5.2 \times 10^5$ Pa at a frequency of $10^2 \text{s}^{-1}$ and a loss modulus (G") of from about $9.5 \times 10^3$ Pa to about $3.1 \times 10^4$ Pa at a frequency of $10^{-1}\text{s}^{-1}$ and about $7 \times 10^4$ Pa to about $5.6 \times 10^5$ Pa at a frequency of $10^{-2}\text{s}^{-1}$, said branched acrylic emulsion polymer having been cured in the presence of from about 0.2 to about 5% by weight of a multifunctional additive, said branched acrylic emulsion polymer formed by emulsion polymerization of about 50 to about 95% by weight of a first monomer which, when homopolymerized, has a glass transition temperature less than −25° C. and at least one second monomer which, when homopolymerized, has a glass transition temperature greater than −25° C., said branched acrylic emulsion polymer having been exposed to electron-beam radiation at a dosage up to about 100 kGy and sufficient to provide a 70° C. shear of at least about 10 kiloseconds while providing a 180° peel of at least 250 N/m and a loop tack of at least 200 N/m at a coat weight of from 40 to 60 g/m².

29. A cured pressure-sensitive adhesive composition as claimed in claim 28 in which the 70° C. shear is at least about 86 kiloseconds.

30. A cured pressure-sensitive adhesive composition as claimed in claim 28 in which the electron-beam dosage was from about 5 to about 50 kGy.

31. A cured pressure-sensitive adhesive composition as claimed in claim 28 in which the multifunctional additive is selected from the group consisting of pentaerythritol triacrylate, trimethylolpropane trimethacrylate, and 1,6-hexanediol diacrylate, and mixtures thereof.

32. A cured pressure-sensitive adhesive composition as claimed in claim 28 in which the first monomer is selected from the group consisting of alkyl acrylates, monoesters of unsaturated dicarboxylic acids and diesters of unsaturated dicarboxylic acids.

33. A pressure-sensitive adhesive composition as claimed in claim 32 in which the first monomer is selected from the group consisting of 2-ethyl hexylacrylate, isooctyl acrylate, and mixtures thereof; and the second monomer comprises an unsaturated carboxylic acid.

34. A pressure-sensitive adhesive composition as claimed in claim 33 in which the unsaturated carboxylic is an acrylic acid.

35. A cured pressure-sensitive adhesive which comprises an electron-beam cured branched acrylic emulsion polymer having a glass transition temperature of at least 20° C. below the use temperature, a storage modulus (G') of from about $3.2 \times 10^4$ Pa to about $1.2 \times 10^5$ Pa at a frequency of $10^{-1}\text{s}^{-1}$ and from about $1.4 \times 10^5$ Pa to about $5.2 \times 10^5$ Pa at a frequency of $10^2\text{s}^{-1}$ and a loss modulus (G") of from about $9,5 \times 10^3$ Pa to about $3.1 \times 10^4$ Pa at a frequency of $10^{-1}\text{s}^{-1}$ and about $7.10^4$ Pa to about $5.6 \times 10^5$ Pa at a frequency of $10^2\text{s}^{-1}$, said branched acrylic emulsion polymer formed of a mixture of at least one acrylic emulsion polymer polymerized in emulsion at a temperature of at least about 30° C., each of said emulsion polymers formed of about 50 to about 95% by weight of a first monomer which, when homopolymerized, has a glass transition temperature less than −25° C. and comprising at least one alkyl acrylate and at least one second monomer which when homopolymerized, has a glass transition temperature greater than −25° C. and comprising at least one unsaturated carboxylic acid, said branched acrylic emulsion polymer having been exposed to electron-beam radiation at a dosage level of from about 5 to about 100 kGy and sufficient to provide a 70° C. shear of at least about 10 kiloseconds in the presence of from about 0.2 to about 5% by weight based on the weight of the branched chain acrylic emulsion polymer of at least one multifunctional monomer, said cured emulsion polymers having a 180° peel of at least about 250 N/m and a loop tack of at least about 200 N/m at a coat weight of from 40 to 60 g/m².

36. A cured pressure-sensitive adhesive curable on exposure to electron-beam radiation to form a pressure-sensitive adhesive providing elevated temperature shear properties which comprises branched acrylic emulsion polymer having a glass transition temperature of at least 20° C. below the use temperature and having a storage modulus (G') of from about $3.2 \times 10^4$ Pa to about $1.2 \times 10^5$ Pa at a frequency of $10^{-1}\text{s}^{-1}$ and from about $1.4 \times 10^5$ Pa to about $5.2 \times 10^5$ Pa at a frequency of $10^2\text{s}^{-1}$ Pa and a loss modulus (G") of from about $9.5 \times 10^3$ Pa to about $3.1 \times 10^4$ Pa at a frequency of $10^{-1}\text{s}^{-1}$ and about $7 \times 10^4$ Pa to about $5.6 \times 10^5$ Pa at a frequency of $10^2\text{s}^{-1}$ and formed in emulsion at a temperature less than about 20° C., said acrylic emulsion polymer formed of about 50 to about 95% by weight of a first monomer which, when homopolymerized, has a glass transition temperature less than −25° C. and comprising one alkyl acrylate and at least one second monomer which, when homopolymerized, has a glass transition temperature greater than −25° C., and comprising an unsaturated carboxylic acid, said acrylic emulsion polymer having been exposed to electron-beam radiation at a level of from about 5 to about 50 kGy in the presence of a multifunctional additive in a positive amount up to 10% by weight of the polymer and sufficient to provide a 70° C. shear of at least about 10 kiloseconds while providing a 180° peel of at least 250 N/m and a loop tack of at least about 200 N/m at a coat weight of 40 to 60 g/m².

37. A cured pressure-sensitive adhesive as claimed in claim 36 in which there was present during cure a multifunctional additive present in an amount of from 0.2 to about 5% by weight based on the weight of the emulsion polymer.

38. A cured pressure-sensitive adhesive as claimed in claim 36 in which 70° C. shear is at least about 86 kiloseconds.

39. A cured pressure-sensitive adhesive as claimed in claim 37 in which the multifunctional additive is selected from the group consisting of pentaerythritol triacrylate, trimethylolpropane trimethacrylate, and 1,6-hexanediol diacrylate, and mixtures thereof.

40. A cured pressure-sensitive adhesive as claimed in claim 39 in which the first monomer is selected from the group consisting of alkyl acrylates, monoesters of unsaturated dicarboxylic acids and diesters of unsaturated dicarboxylic acids, and mixtures thereof.

41. A cured pressure-sensitive adhesive as claimed in claim 40 in which the unsaturated carboxylic acid is acrylic acid.

* * * * *

UNITED STATES PATENT AND TRADEMARK OFFICE
CERTIFICATE OF CORRECTION

PATENT NO. : 5,232,958
DATED : August 3, 1993
INVENTOR(S) : Prakash Mallya; Sebastian S. Plamthottam; Yehuda Ozari It is certified that error appears in the above-indentified patent and that said Letters Patent is hereby corrected as shown below:

Column 3, line 18, after "oscillation" insert a period.

Column 6, line 7, change "180 peel" to -- 180° peel --.
Column 6, line 14, after "charged" delete "with".
Column 6, line 50, change "Pa.S" to -- Pa·s --.

Column 7, line 17, after "active)" insert a period.

Column 8, line 22, change "Pa.s" to -- Pa·s --.

In the Claims

Column 10, line 41, change "hexandiol" to -- hexanediol --.
Column 10, line 59, change "emulsionpolymer" to -- emulsion polymer --.
Column 10, lines 59,60, after "emulsionpolymer," delete "the emulsion-polymer includes a,".
Column 10, line 62, change "Gy" to -- kGy --.

Column 11, line 17, after "carboxylic" insert -- acid --.
Column 11, line 26, change "10'" to -- $10^5$ --.

Column 12, line 13, change "exposed" to -- exposure --.
Column 12, line 15, before "positive" change "an" to -- a --.

UNITED STATES PATENT AND TRADEMARK OFFICE
CERTIFICATE OF CORRECTION

PATENT NO. : 5,232,958
DATED : August 3, 1993
INVENTOR(S) : Prakash Mallya; Sebastian S. Plamthottam; Yehuda Ozari It is certified that error appears in the above-indentified patent and that said Letters Patent is hereby corrected as shown below:

```
Column 13, line 44, after "carboxylic" insert -- acid --.
Column 13, line 53, change "9,5" to -- 9.5 --.
```

Signed and Sealed this

Twelfth Day of April, 1994

Attest:

BRUCE LEHMAN

Attesting Officer

Commissioner of Patents and Trademarks